United States Patent [19]

Bederman et al.

[11] Patent Number: 4,769,814
[45] Date of Patent: Sep. 6, 1988

[54] METHOD FOR ESTABLISHING A LIMITED BROADCAST PATH WITHIN AN INTERCONNECTED NETWORK

[75] Inventors: Seymour Bederman; Richard M. Willett, both of Raleigh, N.C.

[73] Assignee: International Business Machines Corp., Armonk, N.Y.

[21] Appl. No.: 856,266

[22] Filed: Apr. 28, 1986

[51] Int. Cl.$^4$ .................................................. H04J 3/02
[52] U.S. Cl. ........................................... 370/85; 370/88
[58] Field of Search ...................... 370/85, 86, 88, 89, 370/95, 94

[56] References Cited

U.S. PATENT DOCUMENTS 4,577,313  3/1986  Sy ........................................... 370/88
4,644,532  2/1987  George et al. ........................... 370/94
4,680,756  7/1987  Sugimoto et al. ....................... 370/88

Primary Examiner—Douglas W. Olms
Assistant Examiner—Wellington Chin
Attorney, Agent, or Firm—Joscelyn G. Cockburn

[57] ABSTRACT

A method for configuring/reconfiguring a limited broadcast route within a bridge-connected network. The method includes an algorithm, which configures a minimum spanning tree route. A source node generates and transmits a search frame with indicia set to a value representative of a configuration time. Each bridge in the network receives the frame and determines if the setting of the indicia matches the setting of a time code in said bridge. If there is a match, the bridge discards the frame. Otherwise, the frame is forwarded and the bridge is characterized as a limited broadcast (LB) bridge. The process is repeated at subsequent bridges until a leaf bridge is determined. Thereafter, broadcast messages are permitted to advance through the LB bridges.

16 Claims, 9 Drawing Sheets

METHOD FOR ESTABLISHING A LIMITED BROADCAST PATH WITHIN AN INTERCONNECTED NETWORK

BACKGROUND OF THE INVENTION

1. Field of the Invention

The present invention relates to communications systems in general and more particularly to multi-loop communications systems.

2. Prior Art

In the past, several types of communications networks have been proposed or used for transmitting data between a plurality of data sources. The single ring or serial loop configuration is one of the prior art arrangements. Essentially, this type of communications system includes a communication channel formed into a loop. One or more data sources are connected to adapters and the adapters are connected to the communication channel or wire. The adapters are arranged serially about the periphery of the loop. The configuration is such that data flows from a data source through its associated source adapter and serially through one or more intervening adapters. When the data reaches the target adapter, it is extracted from the loop and is subsequently forwarded to the target data source. If there are no intervening adapters, the data flows directly from the initiating data source/adapter through the loop and into the target data source/adapter. A more detailed description of single loop configurations is given in U.S. Pat. No. 3,890,471, issued to Victor Hachenburg on June 17, 1975. The copending patent application, Ser. No. 326,291, filed on Dec. 1, 1981, by P. A. Janson et al, entitled "Method of Transmitting Information Between Stations Attached to a Unidirectional Transmission Ring," and Ser. No. 463,470, filed on Feb. 3, 1983, by Tucker et al, entitled "Protocol for Determining Physical Order of Active Stations on a Token Ring," describe techniques for managing a single loop communication network. Both pending applications are assigned to the assignee of the present invention.

Another prior art configuration is the multi-loop or multi-ring arrangement. The multi-loop arrangement is best suited for an installation where a large number of data sources are to be connected. It is believed that the multi-ring configuration is more efficient than the single loop for handling large number of data sources hereinafter called Data Terminal Equipment (DTE). The multi-loop arrangement consists of a plurality of independent single ring communication network interconnected to one another by one or more switching stations called bridges. Any data source or terminal on one ring may transfer messages to another terminal on the same or different rings. The switching of messages between rings is provided by the switching stations (bridges) which interconnect the rings.

U.S. Pat. No. Re.028,811 (Ser. No. 410,813, filed Oct. 29, 1973, issued on May 11, 1976 to John Robinson Pierce) is an example of the prior art multi-loop comminuciation system. In the patent a plurality of independent rings are interconnected, by switching stations, to form a single network. Messages are conveyed between stations by standardized message blocks. Each message block includes one or more address fields located at the head or beginning of each block. The switching stations use the contents of the address field for switching the messages between rings. A difference criterion is used for switching the message. Essentially, the switching station detects a destination code which is carried in the address field. The detected destination code is then compared with the code for the loop on which the message block is currently circulating. If the codes are different, the message block is switched to another interconnecting loop. The process continues until a match is obtained. This technique does not ensure that the message will traverse the optimum (i.e., shortest) path between source and destination.

U.S. Pat. No. 3,742,144 (Ser. No. 201,744 filed Nov. 24, 1971) describes another technique for routing messages in a digital multi-loop communication network. A Hamming distance criterion is used as the basis for switching messages between the loops.

U.S. Pat. No. 4,081,612 (Ser. No. 705,251 filed July 14, 1976, foreign priority Switzerland July 31, 1974) describes a technique for building up a routing address between stations interconnected by bearer channels and switching nodes.

U.S. Pat. No. 4,049,906 (Ser. No. 679,074 filed Apr. 21, 1976, foreign priority Switzerland Apr. 25, 1975) describes an apparatus for forwarding messages through the switching stations of a digital network with plural switching stations.

Other prior art techniques for routing messages in multi-ring networks are described by D. J. Farber and J. J. Vittal in an article entitled, "Extendability Considerations in the Design of the Distributed Computer System (DCS)," Proceedings, National Telecommunications Conference, November, 1973.

Still other prior art patents including U.S. Pat. Nos. 3,890,471; 4,287,592 and 4,510,492 disclose devices and methods for exchanging messages between communications rings.

The drawback with the prior art is that there is no mechanism which limits the number of copies of a message that will be delivered to a target ring. Thus, multiple copies of the same message will be delivered to a target station. This consumes bandwidth and causes unnecessary congestion on the network.

SUMMARY OF THE INVENTION

It is therefore the general object of the present invention to provide an apparatus and method which ensure that only a single copy of a message is transmitted to a target station in a communications network.

A limited broadcast (LB) path, in the form of a minimum spanning tree, is provided in the network. The path is generated as follows: Periodically, a control station (hereafter called a root node) at a source ring generates and transmits a search frame having indicia set to a selected code. The code is representative of a time stamp which correlates with the time when a reconfiguration cycle is initiated. Preferably, alternate codes (0 and/or 1) are used to differentiate between successive reconfiguration intervals. Of course, other codes may be used without departing from the scope of the present invention. Bridges on the source ring receive the search frame and if the settings of the indicia match a time stamp (indicium) in said bridge, the frame is characterized as being there before and is discarded.

If the setting of the indicia in the search frame is different from the setting of the indicia in the bridge, the setting of the bridge's indicia is changed to that of the search frame indicia. The bridge then issues a Set Frame message to all bridges on the local ring that is connected to the port that is opposite to the port that received the search frame. This opposite port is herein referred to as the "outboard port." On issuing the set frame, the issuing bridge sets a timer. If the timer expires prior to the bridge receiving another set frame and/or stop frame from the outboard port, the bridge is characterized as a LB Bridge and sets a latch to that effect.

If the bridge receives a set frame sequence prior to the expiration of the timer, it reverts into a priority determination mode or routine to determine which bridge on that ring will be characterized as LB. In one routine, the bridge compares the source address in the source address field of the received set frame with its own address and the bridge with the highest address is designated LB. In another routine, an operator can install a "preference code" in a bridge that allows certain bridges to have a higher likelihood of becoming the LB bridge between two rings.

The LB bridge generates and propagates a new search frame to the other (outboard) ring. The process continues until the last bridge i.e., the bridge farthest from the source ring or root node in the network is selected.

In one feature of the invention, the winning bridge issues a stop frame which informs a losing bridge on the outboard ring of its status as the LB bridge.

In another feature of the invention, the leaf bridges (i.e., the bridges farthest from a root node) are determined. This information may be used to perform different types of RAS (Reliability, Availability and Serviceability) functions. Whenever a bridge is deemed to be an LB bridge, it tentatively characterizes itself as a leaf bridge. If a bridge farther away from the root node receives a Search Frame and is tentatively determined to be a leaf bridge, it sends a "Reset Frame" to the bridge that had issued the Search Frame. The receiving bridge then changes its tentative characerization to that of not being a leaf bridge. The process continues until the leaf bridges farthest from the root node are determined.

The foregoing and other features and advantages of this invention will be more fully described in the accompanying description of the drawings.

DETAILED DESCRIPTION OF THE PREFERRED EMBODIMENT

The present invention to be described hereinafter can be used to determine a limited broadcast (LB) path or route within any communications network having a plurality of rings or broadband networks (hereinafter called "communications facilities") interconnected by a plurality of bridges or switching stations to form an interconnected network. Because such interconnected networks come in a plurality of different topologies, no attempt will be made in this specification to identify a particular topology. Suffice it to say that the present invention can be used for tracing a LB path through any type of network. As is used herein, a LB path is one which allows a single copy of a message to be delivered to any communications facility (bridge and/or DTE) within the network. For example, different pictorials of network topologies are shown in patent application Ser. No. 616,754, filed June 4, 1984, by K. K. Sy and entitled "Routing Mechanism for Encapsulated FCS for a Multi-Ring Local Area Network" (now U.S. Pat. No. 4,577,313 and application Ser. No. 616,742, filed June 4, 1984, by K. K. Sy and entitled "Routing Architecture for a Multi-Ring Local Area Network." The applications are assigned to the assignee of the present invention and are incorporated herein by reference.

In order to simplify the description, the invention will be described in relationship with a two-ported bridge. However, this should not be construed as a limitation on the scope of the present invention since it is well within the skill of one skilled in the art to extend the teachings and concepts of the present invention to a bridge having more than two ports.

Figure 1:
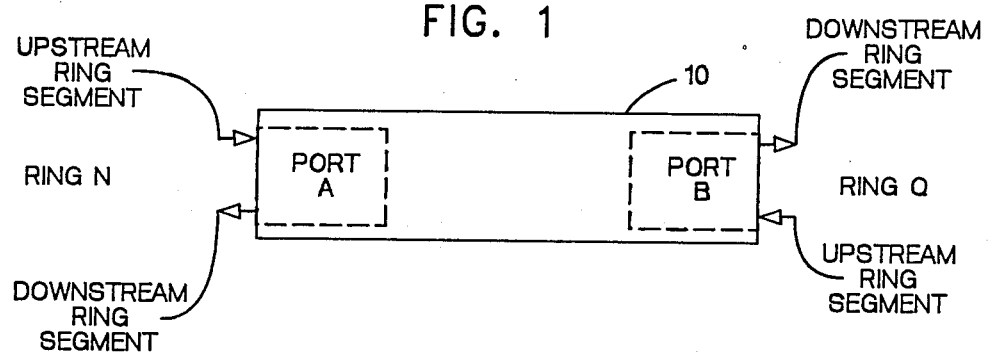
FIG. 1 shows a conceptual block diagram of a two-ported bridge.

FIG. 1 is a conceptual block diagram of a two-ported bridge. The bridge identified by numeral 10 includes port A which is coupled to ring N and port B which is coupled to ring Q. Ring N is a unidirectional ring with its signal traveling in the direction shown by the arrows. A plurality of stations (not shown) are hereinafter called "Data Terminal Equipment" (DTE) are coupled to ring N. Data signals from the DTEs are delivered over the upstream ring segment to port A. Likewise, data signals from port A are delivered through the downstream ring segment to the DTEs.

Similarly, port B couples ring Q to bridge 10. As with ring N, ring Q has a downstream ring segment which conveys electrical signals from port B to a plurality of attached DTEs (not shown) and an upstream ring segment which conveys electrical signals from the DTEs (not shown) to port B. Each port is assigned a unique address. In the preferred embodiment of this invention, the address has six octets. The bridge inserts this six-octets address into the source address field of a frame that is originated by the bridge, and then transmitted via the port. The bridge will copy a frame whose destination address matches the port's assigned address. In addition, the bridge will copy a frame whose destination address is set to the bridge functional address. As is used herein, a functional address is a group address which is used to identify a set of bridges.

Figure 2:
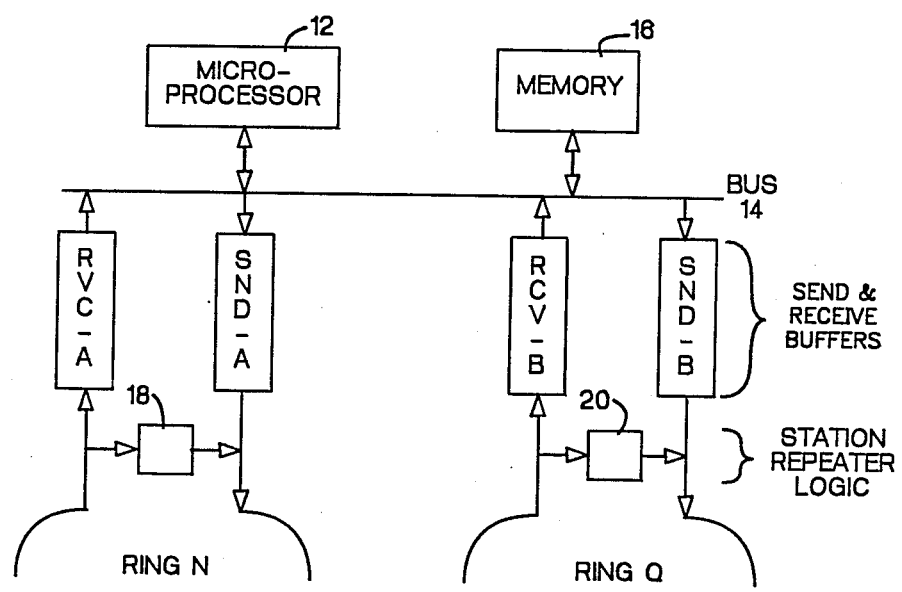
FIG. 2 shows a more detailed conceptual block diagram of a two-ported bridge.

FIG. 2 shows a more detailed conceptual block diagram of the two-ported bridge. The bridge includes microprocessor 12 which is connected to bus 14. The microprocessor has an associated memory, identified by numeral 16, connected to bus 14. As will be explained subsequently, memory 16 is used for storing various information to be described subsequently. The information will be shown as being stored in latches and registers. Of course, the latches and registers can exist at specified locations of the memory element 16. A pair of buffers labeled RCV-A (receive buffer A) and SND-A (send buffer A) interconnect ring N to bus 14. Station repeater logic 18 repeats signals from the upstream segment of ring N to the downstream segment of ring N. Likewise, a pair of buffers labeled RCV-B (receive buffer B) and SND-B (send buffer B) interconnects ring Q to bus 14. Station repeater logic 20 interconnects the upstream ring segment of ring Q to the downstream ring segment of ring Q. Microprocessor 12 examines frames (to be described hereinafter) received from either ring N (via receive buffer A) or received from ring Q (via receive buffer B). Likewise, the microprocessor originates frames (to be described hereinafter) and sends them to either ring N (via send buffer A) or to ring Q (via send buffer B).

As was mentioned above, certain sections of memory element 16 are designated "controlled section" which carries a plurality of latches and registers which are used in finding the limited broadcast path within the network. Each bridge is provided with two storage registers identified as source address register-1 (SAR-1) and source address register-2 (SAR-2). Source address register-1 stores the source address which is contained in a search frame (to be described subsequently) whose receipt triggers the start of the Search Propagation Delay Timer (SPDT) (to be described subsequently). Source address register-2 stores the source address of a set frame (to be described hereinafter) that is received via the outboard port. It should be noted that the "outboard port" of a bridge is the port opposite to the port in which the search message was received. Thus, in FIG. 1, port B is the outboard port for messages coming off ring N into port A. Port A is then the inboard port. Similarly, port A is the outboard port for messages coming into port B. Stated another way, the inboard port is defined as the port from which a search frame (to be described hereinafter) that started the SPDT timer is received. The outboard port is the other port of the bridge.

A search propagation delay timer (SPDT) is provided in each bridge. The timer is started by the receipt of a search frame (to be described hereinafter) if, when received, the timer is not already running. In the preferred embodiment of this invention, the timer has a default value of one second. While the timer is running, it generates a "timer running" signal. When the timer expires, it generates a "timer expired" pulse signal. The signals are used by the microprocessor in selecting the bridge which will be called a limited broadcast bridge.

A two-bit LB preference code register is provided at each bridge in the network. The register contains a value which is set up when the various bridge parameters are initialized. This value or code allows network management personnel to favor one bridge over other bridges as a candidate for assuming the limited broadcast role.

In addition to the bridge registers, several latches are provided in each bridge. In the preferred embodiment of the invention six latches are provided. The states of the latches control whether or not the bridge will assume the limited broadcast role and, if so, whether the bridge is in a "leaf" position of the limited broadcast spanning tree path. When the path is configured, its topology is in the form of a minimum spanning tree with the node which initiates the configuration routine being the root of the tree and the linked bridges being the branches. With this nomenclature, the bridge which is farthest from the root node is called the "leaf." The latches which are provided at each bridge are:

(a) old limited broadcast state: when this latch is set to a digital one, the bridge is part of the limited broadcast path.

(b) limited broadcast leaf: when this latch is set to a digital one, the bridge is in a leaf position of the limited broadcast spanning tree.

(c) Port A odd/even: This latch is set to the state of the odd/even bit of a set frame received via port A. The odd/even bit is the time stamp indicia that is present in a Set Frame.

(d) Port B odd/even: This latch is set to the state of the odd/even bit of a set frame received via port B.

(e) Port A inboard: This latch is set to a digital one if an initiating search frame is received via port A. As will be explained subsequently, an initiating search frame arrives while the SPDT timer is not running. This frame has an odd/even bit that is opposite to the current state of the odd/even latch.

(f) Port B inboard: This latch is set to one if an initiating search frame is received via port B.

(g) New limited broadcast state: The state of this latch is transferred to the old limited broadcast state latch, when the SPDT timer expires. After this transferal, the new limited broadcast state latch is reset.

(h) Set frame sent: This latch is set to a digital one when a bridge inserts a set frame into one of its send buffers. Having described the hardware that is used in the bridge for establishing a limited broadcast route, the frames which are transmitted will now be described.

Figure 3:
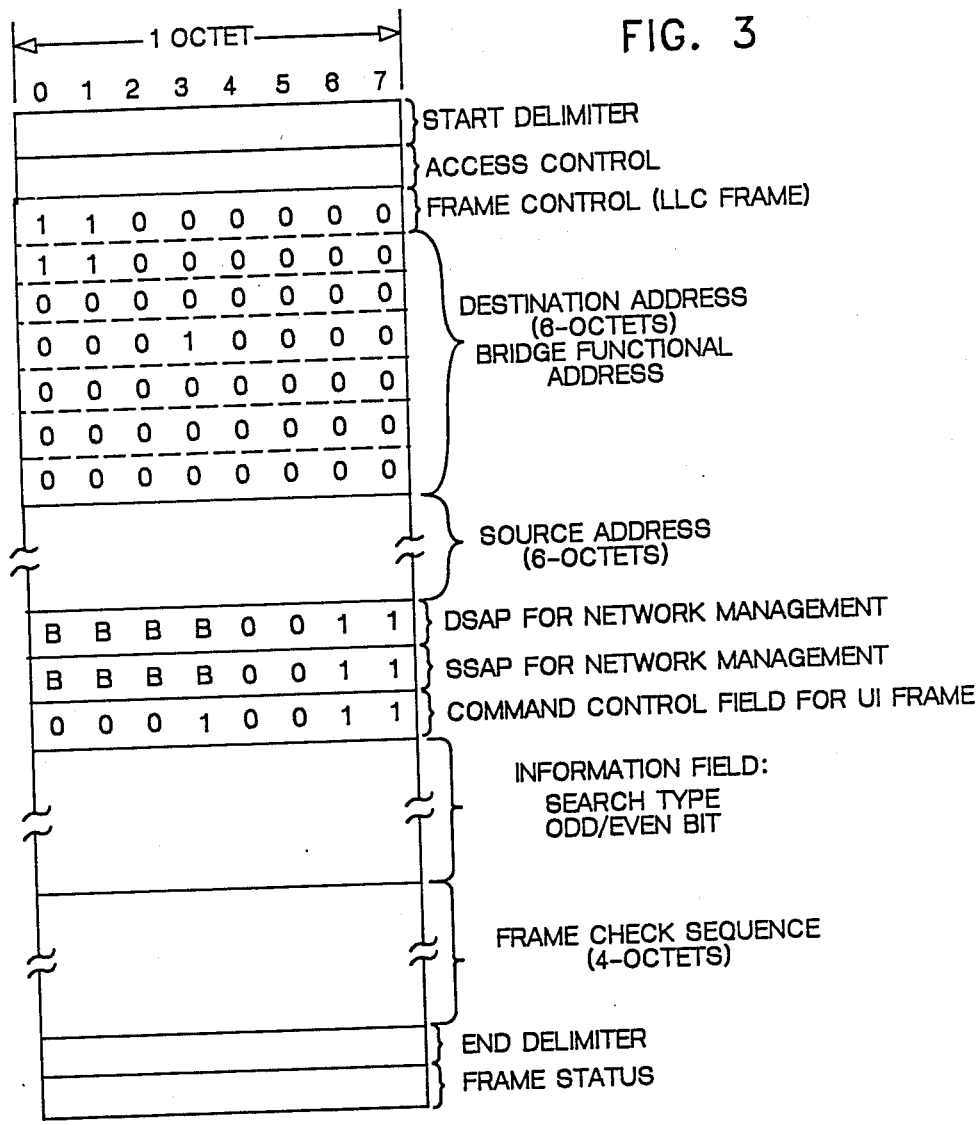
FIG. 3 shows a format for a Search Frame.

FIG. 3 shows a graphical representation of a search frame. The frame consists of a string of octets and is generated and transmitted from a root node whenever a configuration cycle is initiated. It should be noted that a root node can initiate configuration cycle periodically. Of course, the frequency of reconfiguration depends on the operator or other system parameters. The search frame includes a plurality of fields beginning with a start delimiter and ending with a frame status. The description for each of the fields is well defined in the IEEE 802.1 and 802.5 Standards which are available for further review. Henceforth, only those fields that are germane to the present invention will be described in detail. The format is particularly suited for a token passing ring such as that described in the same IEEE Standard. The destination address in the search frame is set to the bridge functional address. A bridge will copy a frame if it sees its functional address in the destination address field. The command control field for UI (unnumbered information) frame carries a special command informing the bridge that the frame is an unnumbered information frame. The information field carries a sequence of bits which informs the bridge of the type of frame. In this particular case, the sequence identifies the frame as a search frame. Also, the odd/even bit is in the information field and indicates the time when the frame is transmitted from the root node. The bit alternates between consecutive configuration cycles and indicates to the bridge if the Set Frame was there before.

Figure 4:
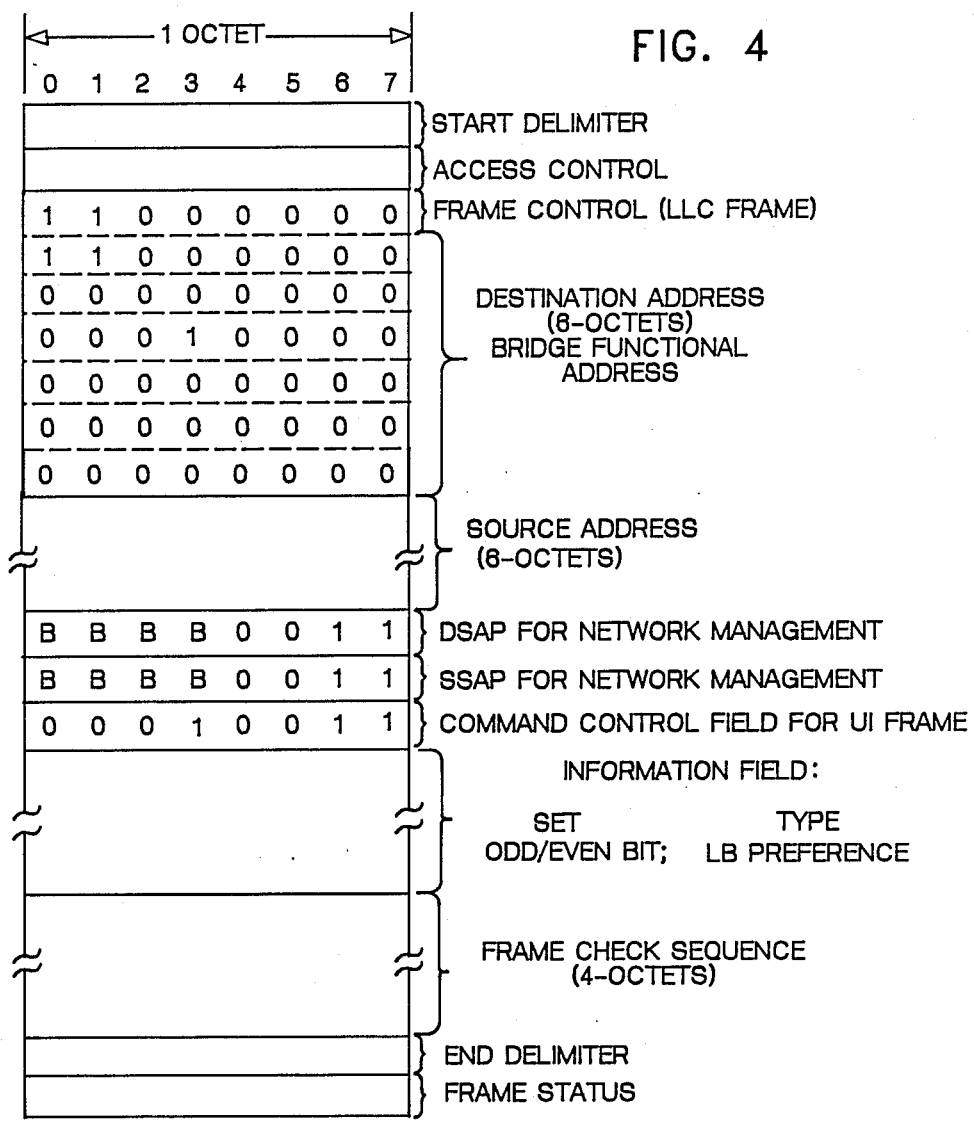
FIG. 4 shows a format for a Set Frame.

FIG. 4 shows a graphical representation of the set frame. The set frame has a format substantially identical to that of the search frame. The information in the information field is a sequence which identifies the frame as being a set frame. The set frame is generated and is transmitted by a bridge which receives a search frame that has an odd/even bit opposite to the value currently associated with the receiving port and at a time when SPDT is reset. If the setting of the odd/even bit is the same as the setting of the odd/even bit in the received search frame, then the received search frame is discarded and no further action occurs. A set frame is not transferred across the bridge to another ring. It is restricted to set odd/even latches of bridges on the ring to which the issuing bridge is connected.

Figure 5:
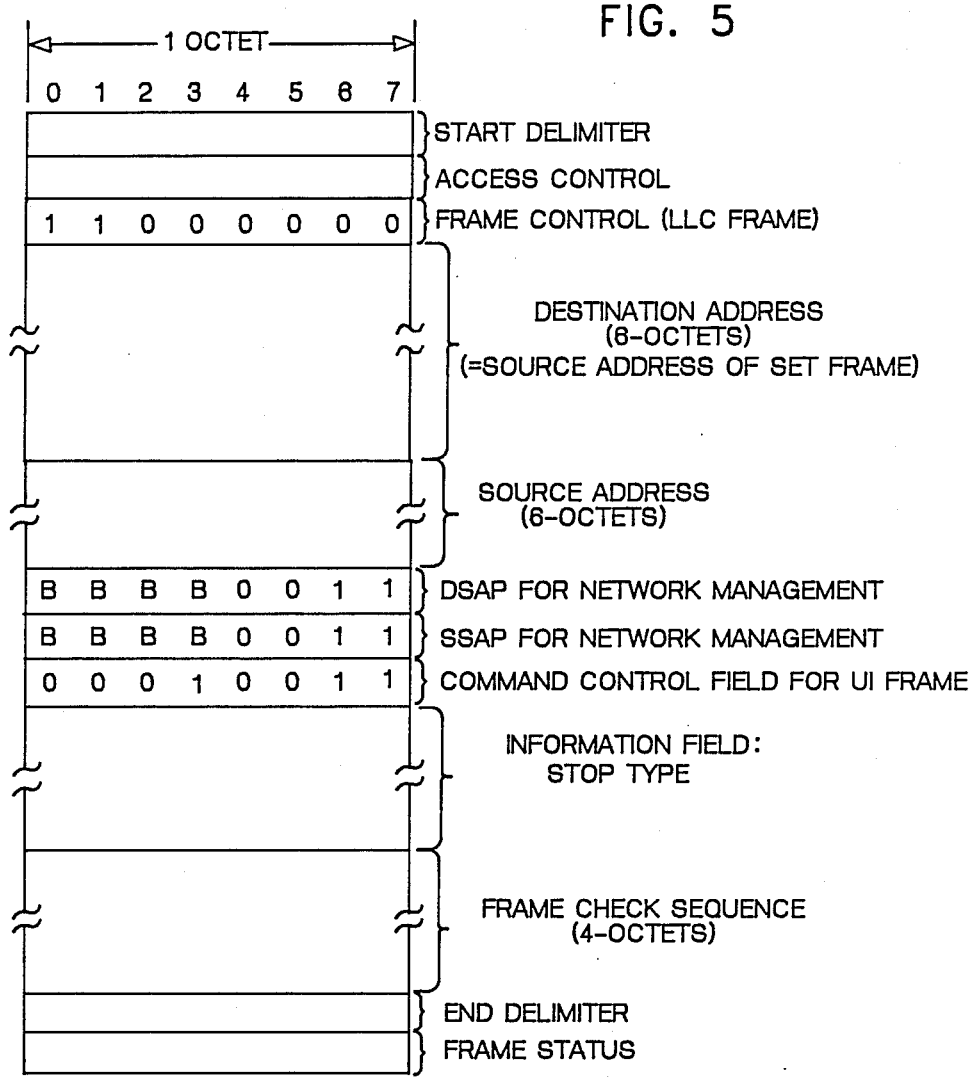
FIG. 5 shows a format for a Stop Frame.

FIG. 5 shows a graphical representation of a stop frame. The format of the frame conforms with the IEEE 802.1 and 802.5 standard. Of interest is the information field which carries a bit sequence indicating that the frame is a stop frame. The stop frame is issued on a local ring by a bridge which has received a Set Frame from another bridge, while the SPDT is set, and this bridge has determined that it has a higher preference code/source address value than the bridge that originated this set frame.

Figure 6:
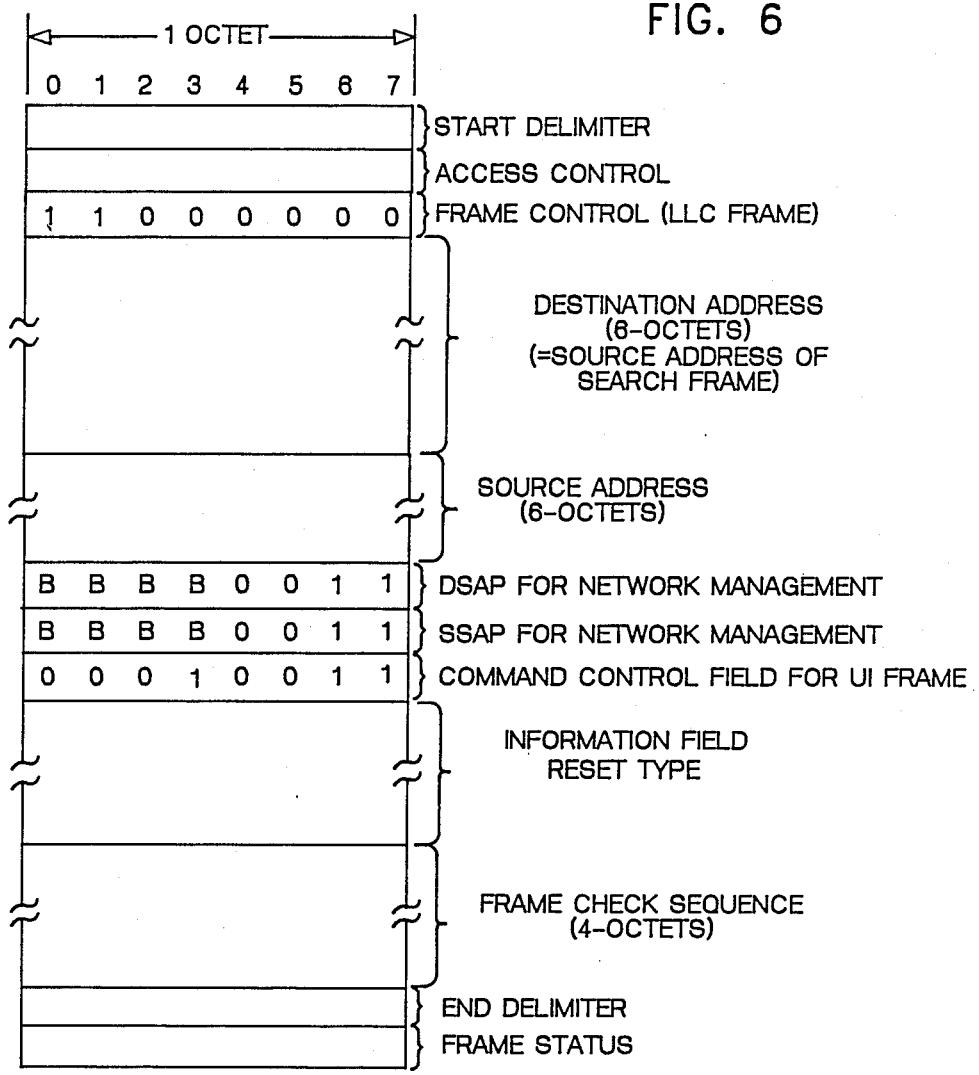
FIG. 6 shows a format for a Reset Frame.

FIG. 6 shows a graphical representation of a reset frame. The format of this frame is substantially the same as the stop frame and conforms to the IEEE 802.1 and 802. 5 standard. Of interest is the information field which carries a sequence of bits indicating that the frame is a reset frame. As will be explained subsequently, every bridge which is deemed to be a limited broadcast bridge initially characterizes itself as a leaf bridge. If a bridge on the outboard ring is determined to be a limited broadcast bridge, then it issues a message (reset frame) to the bridge from which it has received a search frame. This latter bridge had initially characterized itself as a leaf. On receiving the reset frame, the bridge changes its latch to a zero state. The bridge is a leaf bridge if it does not receive the reset message after a predetermined instant of time. In the preferred embodiment of this invention, the leaf bridge transmits a message to a control node informing the node of its status. The node can use the information to perform several types of RAS functions.

A bridge includes a program logic that analyzes every UI frame that is received and that has a destination address that causes the bridge to copy the frame. The analysis results in the following determinations which may be provided as electrical signals:
 1. frame type (search or set or stop or reset)
 2. port from which received (port A or port B)
 3. source address (six octets)
 4. odd/even bit (only from search or set frames)
 5. limited broadcast preference code (only from set frame).

As stated above, in addition to receiving frames, the bridge also generates and transmits UI frames. The bridge includes programmed logic that permits the bridge to construct a frame and to then transmit this frame via one of its ports. The frame generation requires the input of the following information:
 1. frame type (search or set or stop or reset)
 2. port from which to send (port A or port B)
 3. destination address (six octets)
 4. odd/even bit (only for search or set)
 5. limited broadcast preference code (only for set).

It should be noted that the limited broadcast path is generated from a reconfiguration cycle. This cycle is initiated from a source node and can be done at predetermined intervals. The process includes selective generation and a transmission of the above- described UI frames.

Figure 7:
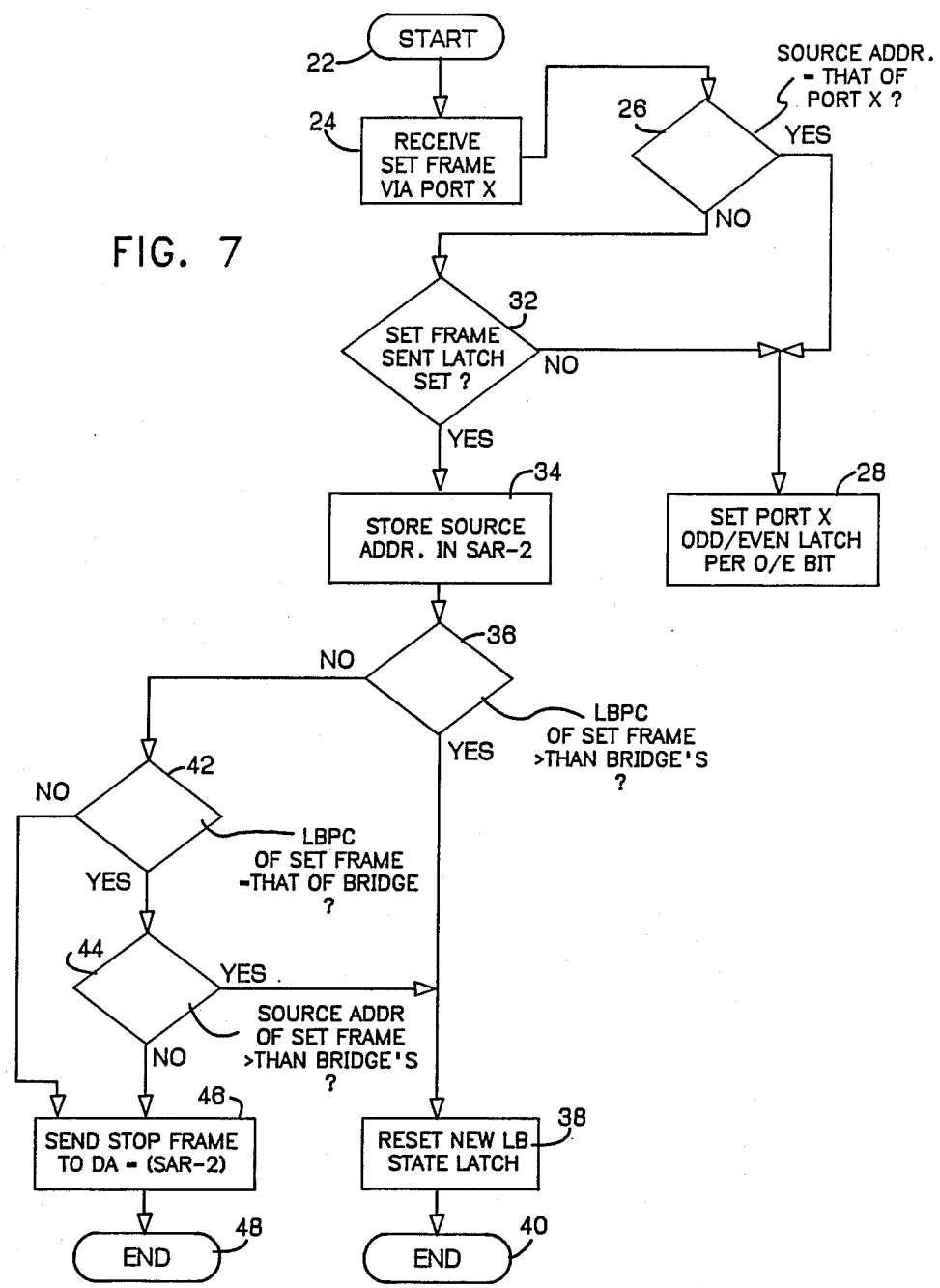
FIG. 7 shows a flow chart of a program used to process the Set Frame.

Referring now to FIG. 7, a flow chart of the program used by the bridge to process the set frame is shown. The first block in the program is identified by numeral 22. It is a start block and indicates the point whereat the processor in the bridge enters the program. The program then descends into block 24 where it receives the set frame via port X. The program then enters block 26 where it checks to see if the source address in the set frame equals its own address. If it is, the program descends into block 28 where it sets port X's odd/even latch to the value of the odd/even (O/E) bit in the set frame and descends into block 30 from whence it exits the program. If at block 26 the source address in the set frame is different from port X's address, the program then descends into block 32. In block 32 the program checks to see if the set frame latch is set. If it is not set, the program enters block 28 where it performs the previously-described function and exits the program through block 30.

If the set frame send latch (block 32) is set, the program then descends into block 34. In block 34 the program stores the source address in the set frame in the SAR-2 (search address register). The program then descends into block 36. In block 36 the program checks to see if the Limited Broadcast Preference Code is greater than the bridge's identification number. If it is, the program descends into block 38 where it resets the new limited broadcast state latch and exits the program through block 40.

If the LBPC of the set frame is equal to or less than the bridges (block 36), the program descends into block 42. In block 42 the program checks to see if the LBPC of the set frame equals that of the bridge. If it is, the program descends into block 44 where it checks to see if the source address of the set frame is greater than the source address of the bridge. If it is, the program descends into block 38 where it performs the previously-described function and exits the program through block 40. If the source address of the set frame is less than the bridges (block 44), the program descends into block 46. In block 46 the program sends a stop frame with the destination address (DA) set to the value of the SAR-2 register. The program then descends into block 48 from whence it exits the program. Referring to block 42, if the LBPC of the set frame is not equal to that of the bridge, the program descends into block 46 where it performs the previously-described function and exits the program via block 48.

Figure 8:
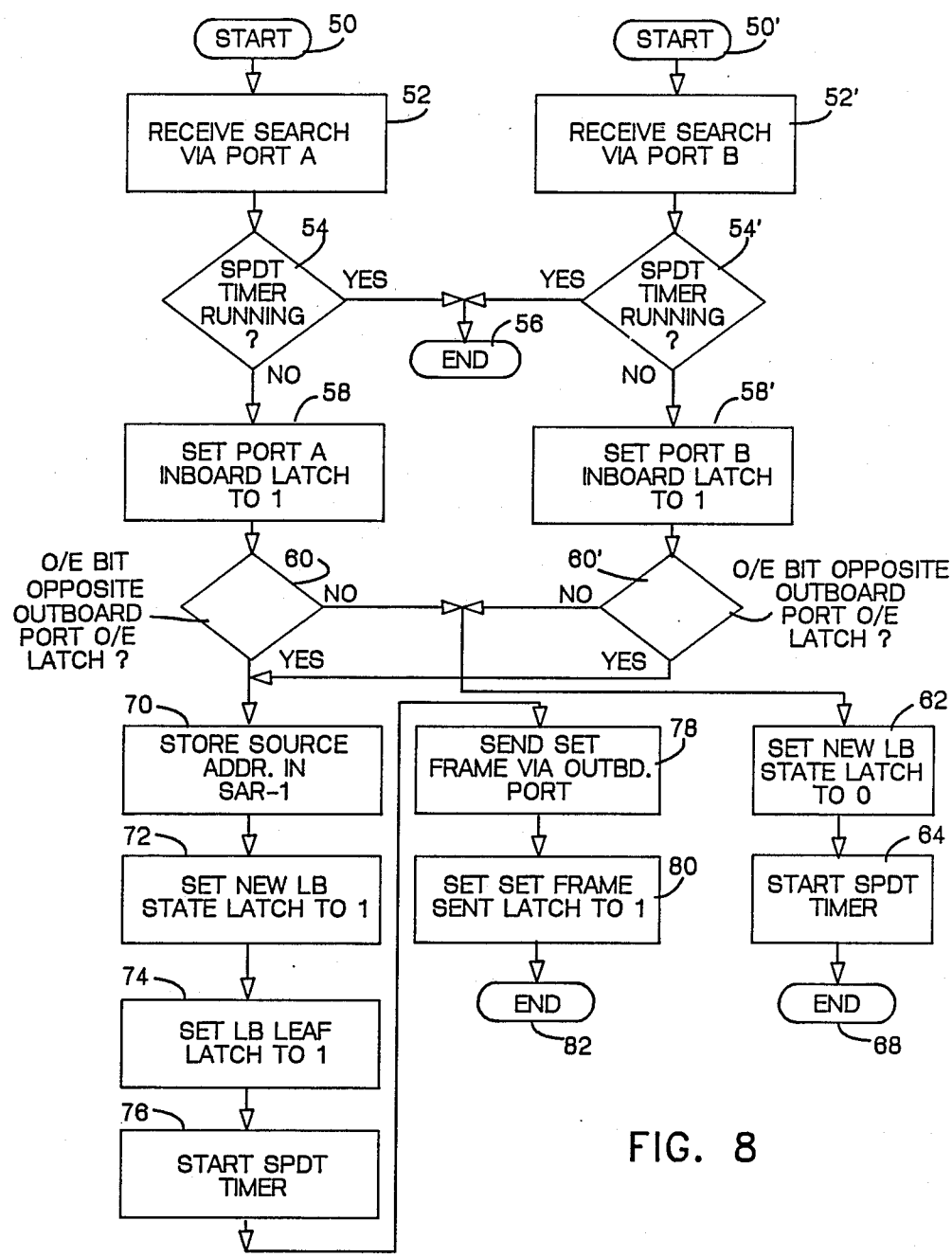
FIG. 8 shows a flow chart of a program used to process a Search Frame.

FIG. 8 shows a flow chart of the program used by the microprocessor to process a search frame.

FIG. 8 shows a flow chart of the method which a bridge uses to process a search frame. Since a search frame can be received at either port A or port B of a two-ported bridge, unscripted numeral will be used to identify process blocks for port A while similar numeral with upper scripts will be used to identify the process blocks for port B. It is believed that such nomenclature will simplify the description of the present invention. Also, to further simplify the description, only the process blocks with unscripted numerals will be described. It being understood that the process blocks identified with scripted and unscripted numerals operate in the same way to perform identical functions and the description of one necessarily describes the other. Block 50 represents the point whereat the processor enters the program and descends into block 52. In block 52 the bridge has received a search frame via port A. The processor then descends into block 54. In block 54 the processor checks to see if the SPDT timer is running. If it is, the processor descends into block 56 and exits the program. If the SPDT timer is not running (block 54) the processor descends into block 58. In block 58 the processor sets port A inboard latch to one and descends into block 60. In block 60 the program checks to see if the odd/even (O/E) bit in the search frame is set to a value that is opposite to the value of the odd/even latch on the outboard ports of the bridge. If it is not, the program descends into block 62 where it sets the new limited broadcast latch to a logical zero. The processor then descends into block 64 where it starts the SPDT timer running and exits the program through block 68.

Referring back to block 60, if the setting of the O/E bit in the search frame is different from the setting of the O/E latch, the program descends into block 70. In block 70 the program stores the source address in the search frame in the SAR-1 register and descends into block 72. In block 72 the program sets the new limited broadcast state latch to one and descends into block 74. In block 74 the processor sets the limited broadcast leaf latch to one and descends into block 76. In block 76 the program starts the SPDT timer and descends into block 78. In block 78 the program generates and sends a set frame via the outboard port and descends into block 80. In block 80 the program sets the set frame send latch to one and exits the program through block 82.

Figure 9:
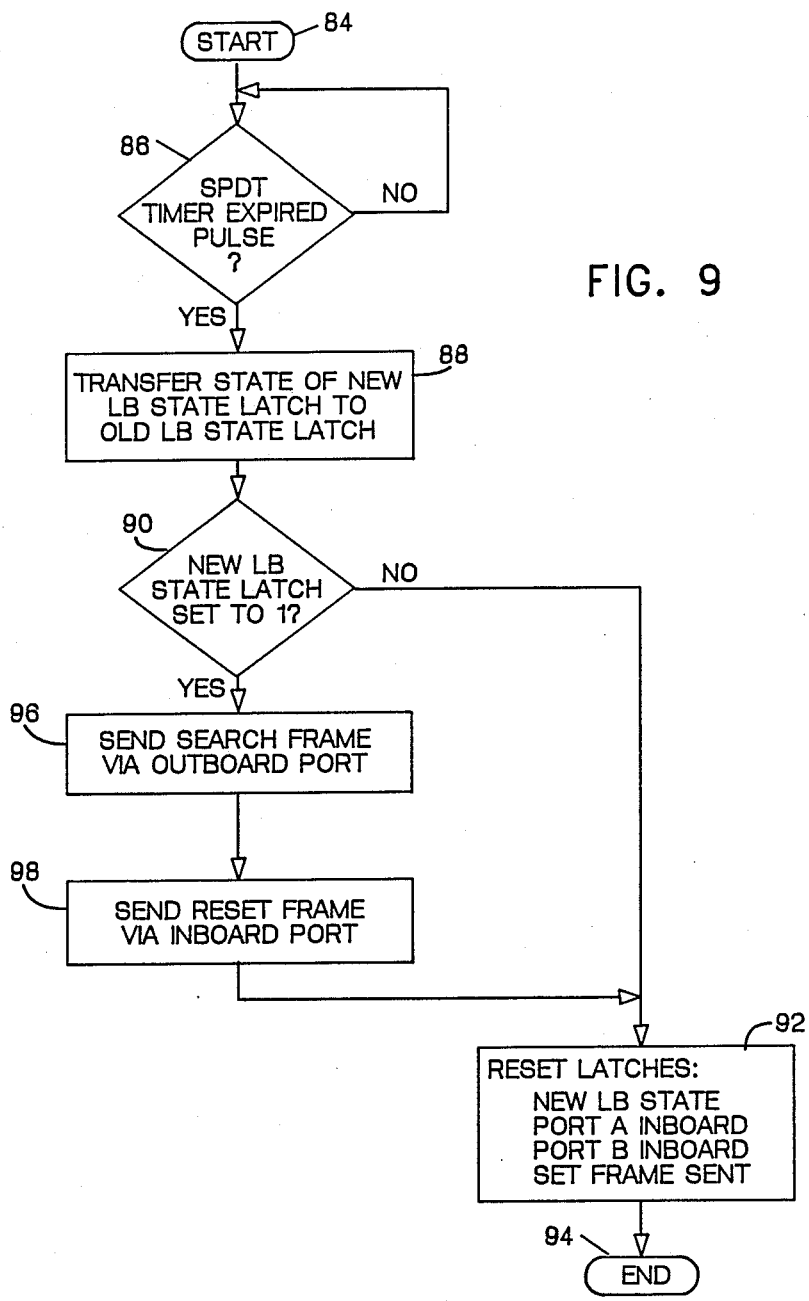
FIG. 9 shows a flow chart of a program used to control bridge timers and latches.

FIG. 9 shows a flow chart of the program used to control bridge timers and latches. The first block in the program is an enter block identified by numeral 84. From block 84 the program descends into block 86 where it checks to see if the SPDT timer has outputted an expired pulse. If there has not been an expired pulse, the program loops until there is one which forces the program into block 88. In block 88 the program transfers the state of the new limited broadcast state latch to the old limited broadcast state latch and descends into block 90. In block 90 the program checks to see if the new limited state latch is set to a logical one. If it is not set to a logical one, the program descends into block 92. In block 92 the program resets the new limited broadcast state latch, port A inboard latch, port B inboard latch and set frame send latch. The program then exits through block 94. Referring to block 90, if the new limited state latch is set to one, the program descends into block 96 where it sends a search frame via the outboard port. The program then descends into block 98. In block 98 the program sends a reset frame via inboard port and descends into block 92. In block 92 the program performs the previously described function and exits through block 94.

Figure 10:
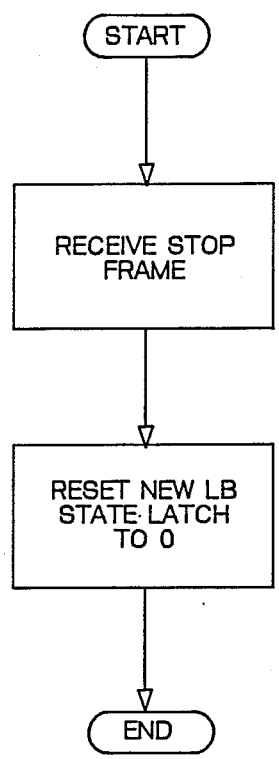
FIG. 10 shows a flow chart of a program for processing a Stop Frame.

FIG. 10 shows a flow chart of a program for processing a stop frame. Essentially, when a stop frame is received, the bridge resets the new limited broadcast state latch to zero and exits the program.

Figure 11:
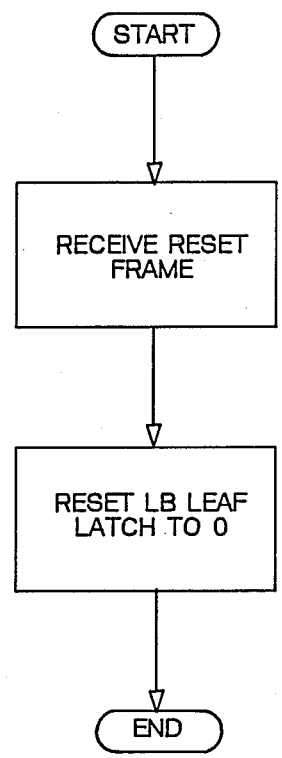
FIG. 11 shows a flow chart of a program for processing a Reset Frame.

FIG. 11 shows a program for processing a reset frame. Essentially, a bridge on receiving a reset frame resets the limited broadcast leaf latch to zero and exits the program.

OPERATION

In operation, the reconfiguration process is initiated by a station on a "root" ring. The criteria for selecting the station is beyond the scope of the present invention and is not described. The station initiates the limited broadcast reconfiguration process by obtaining the new value of the odd/even bit from an internal register. As stated before, the value of the odd/even bit must alternate between successive reconfiguration cycles. The station then sends out a set frame which sets the inboard latch of all bridges on that ring to a known value and starts a timer. When the timer expires, the station sends out a search frame. Each bridge on the root ring receives the search frame and compares the odd/even bit therein with the setting in the odd/even latch of the outboard port. Among other things, the bridge activates the SPDT timer. If the timer expires before the bridge receives another set frame or stop frame, the bridge characterizes itself as a limited broadcast bridge and sets a latch to that effect. The bridge then retransmits a search frame and characterizes itself as a leaf bridge.

If another set frame is received before the SPDT timer expires, the bridge reverts into a priority determination mode to determine whether or not it should be a limited broadcast bridge. This is done by the bridge comparing its LB Preference Code and its address with the LBPC and Source address in the received set frame. The bridge having the highest LBPC is designated the winning limited broadcast bridge and issues a stop frame to that effect. In case both LBPC's are equal, the bridge with the highest source address is the winner. The bridge which is declared limited broadcast retransmits the search frame to the bridges further downstream or outward from the root node. The process then continues until the search frame reaches a ring that is farthest from the root node. Every bridge which retransmits a search frame temporarily characterizes itself as a leaf bridge. The characterization is maintained until it receives a reset frame transmitted from a bridge which is farther from the source ring.

While the invention has been particularly shown and described with reference to a preferred embodiment thereof, it will be understood by those skilled in the art that various changes in form and details may be made therein without departing from the spirit and scope of the invention.

Having thus described our invention, what we claim and desire to secure as Letters Patent is as follows:

1. In a communications network wherein a plurality of communications facilities are interconnected by a plurality of bridges and each facility having a plurality of DTEs connected thereto a method for determining a limited broadcast path within said network comprising the steps of:
 (a) generating and transmitting from a control DTE connected to one of the plurality of communications facilities a first message which includes identification field with a sequence of bits for identifying the first message and a control field with an indicia set to a first code;
 (b) receiving the first message at bridges interconnecting said one of the communications facilities with other communications facilities;
 (c) examining the first code to determine if it correlates with a state code at outboard ports of said bridges
 (d) discarding said first message only if the first code and the state code match otherwise participating in an arbitration process to select one of the bridges as a limited broadcast (LB) bridge; and retransmitting the first message from the LB bridge to other bridges associated with said other communications facilities.

2. The method set forth in claim 1 further including the steps (e) receiving the first message retransmitted in step (d) at inboard ports of the other bridges connected to said other communications facilities; and (f) performing steps (c) through (e) at each of all other bridges in said network receiving retransmitted first message until the limited broadcast path is established within said network.

3. The method of claim 2 further including the steps of
   (g) generating, at each bridge which retransmits the first message a second message having a second identification sequence and a code representing an action to be taken;
   (h) transmitting the second message to bridges associated with a communications facility connected to the bridge in step (g);
   (i) receiving the second message at the bridges in step (h); and
   (j) examining the code to determine the action to be taken; and (k) repeating steps (g) through (j) until a transmitting bridge in step (h) does not receive the second message thereby indicating it as a leaf bridge in said network.

4. The method set forth in claim 1 wherein the indicia includes a bit whose setting alternates between an even and an odd value for consecutive generation of the first message.

5. In a communication network wherein a plurality of communications facilities are interconnected by a plurality of bridges and each facility having a plurality of DTEs connected thereto an apparatus for determining a limited broadcast path within said network comprising:
   (a) means for generating and transmitting from a control DTE connected to a first facility a first message having a first identification sequence and an indicia set to a first code;
   (b) means for receiving the first message at bridges connected to the first facility;
   (c) means at each bridge for examining the first code to determine if it correlates with a state code at outboard ports of said bridges;
   (d) means at each bridge for discarding said first message only if the codes match; means at each bridge for participating in an arbitration process to determine a LB bridge; and means at the LB bridge for generating and retransmitting another message with the first identification sequence and the indicia set to the first code.

6. The apparatus of claim 5 wherein the indicia includes a logical bit whose state is changed on sequential isuance of the first message.

7. In a communications network wherein a plurality of communications facilities are interconnected by a plurality of bridges and each facility having a plurality of DTEs connected thereto a method for determining a limited broadcast path within said network comprising the steps of:
   (a) generating and transmitting from a control DTE connected to one of the communications facilities a first message which includes an identification field with a sequence of bits for identifying said first message and a code field with an indicia set to a first code;
   (b) receiving the first message at bridges interconnecting said one of the communications facilities to other facilities;
   (c) examining the first code to determine if it correlates with a state code at outboard ports of said bridges;
   (d) discarding said first message only if the codes match; otherwise
   (e) setting a timer to run for a desired time period;
   (f) generating and transmitting a second message having an identification field carrying a sequence of bits which identifies the second message and a code field with a code similar to the first code in the first message;
   (g) monitoring incoming messages and if a message having an identification field with a sequence of bits similar to the sequence of bits in the second message is received, prior to the timer in step (e) expiring, then participate in an arbitration process to select one of the bridges interconnecting the first facility and the other facilities as a limited broadcast (LB) bridge;
   (h) retransmitting the first message from the LB bridge to inboard ports of bridges on said other facilities; and
   (i) setting an indicium in said LB bridge thereby indicating its status as an LB bridge.

8. The method set forth in claim 7 further including the step of repeating steps (b) through (i) at other interconnecting bridges, remaining in the network, which receive a retransmitted first message until the limited broadcast path is established within said network.

9. The method of claim 7 wherein the arbitration process of step (g) includes the steps of: (j) comparing a limited broadcast (LB) Preference Code stored in said bridges with a LB Preference Code in said second message;
   (k) selecting a bridge with the highest LB Preference Code as the LB bridge; and
   (l) generating and transmitting from the LB bridge a stop message.

10. The method of claim 7 wherein the arbitration process of step (g) includes the steps of: (m) comparing source addresses in said bridges with a source address in said second message; (n) selecting a bridge with the highest source address as the LB bridge; and (o) generating and transmitting from the LB bridge a stop message.

11. The method of claim 9 or claim 10 further including the steps of retransmitting the first message from the LB bridge; and setting an indicium in said LB bridge to identify it as a leaf bridge.

12. The method set forth in claim 11 further including the step of resetting the indicium only if a reset message is received from another leaf bridge.

13. In a communications network wherein a plurality of communications facilities are interconnected by a plurality of bridges and each facility having a plurality of DTEs connected thereto a method for determining a limited broadcast path within said network comprising the steps of:
   (a) generating and transmitting from a control DTE connected to one of the communications facilities a first message which includes an identification field with a sequence of bits for identifying said first message and a code field with an indicia set to a first code;
   (b) at each bridge in the network which receives the first message, performing the steps of (i) discarding the first message only if it has already been to said one of the communications facilities; otherwise
   (ii) participating in an arbitration process with other bridges connecting into said one of the communications facilities with a winner of the arbitration process further performing the steps of
   (iii) setting an indicium in the other bridges to indicate that the first message has already been on said one of the communications facilities;
   (iv) changing its own state to a Limited Broadcast state; and (v) retransmitting the first message.

14. The method set forth in claim 13 wherein the plurality of communications facilities includes ring communications networks.

15. The method set forth in claim 13 wherein the control DTE, prior to issuing the first message, issues a time stamp message with a control field having a bit set to a first value representative of a time when a reconfiguration cycle is initiated; receiving the time stampe message at each bridge associated with said one of the communications facilities and setting a time stamp indicator in each bridge to match the setting of the bit in the time stamp message.

16. The method set forth in claim 15 wherein the control DTE sets the bit to alternate values for consecutive reconfiguration cycles.

* * * * *